United States Patent [19]

Myers et al.

[11] E Patent Number: Re. 32,658

[45] Reissued Date of Patent: May 3, 1988

[54] HANGING BAG WITH DETACHABLE COWL

[75] Inventors: Jay E. Myers, Laguna Beach, Calif.; M. Todd Myers, New York, N.Y.

[73] Assignee: Andiamo, Inc., Fountain Valley, Calif.

[21] Appl. No.: 816,499

[22] Filed: Dec. 27, 1985

Related U.S. Patent Documents

Reissue of:

[64] Patent No.: 4,489,829
Issued: Dec. 25, 1984
Appl. No.: 477,151
Filed: Mar. 21, 1983

[51] Int. Cl.[4] ..... B65D 85/18
[52] U.S. Cl. ..... 206/287
[58] Field of Search ..... 206/287, 286, 287.1; 383/78, 83, 84, 85, 89

[56] References Cited

U.S. PATENT DOCUMENTS

| | | | |
|---|---|---|---|
| 2,000,324 | 5/1935 | Fleischer | 206/286 |
| 2,574,786 | 11/1951 | Hiatt | 206/286 |
| 3,958,675 | 5/1976 | Rosenblum | 190/43 |
| 3,999,639 | 12/1976 | Walters | 190/60 |
| 4,236,657 | 12/1980 | Brunton | 224/153 |

*Primary Examiner*—Henry J. Recla
*Assistant Examiner*—David Voorhees
*Attorney, Agent, or Firm*—Gausewitz, Carr & Rothenberg

[57] ABSTRACT

A flexible folding garment bag having a detachable cowl is described. The cowl covers the open upper ends of the front panels of the bag and is provided with an interior compartment and means for hanging the cowl in either a vertical or horizontal orientation while removed from. Alternatively, the cowl can be attached to the rear of the bag or folded to expose the closure means on the front of the bag.

11 Claims, 2 Drawing Sheets

HANGING BAG WITH DETACHABLE COWL

Matter enclosed in heavy brackets [ ] appears in the original patent but forms no part of this reissue specification; matter printed in italics indicates the additions made by reissue.

BACKGROUND OF THE INVENTION

This invention relates to elongated hanging bags or garment bags of the type having a vertical fastening means, such as a zipper, along a front panel of the bag, the panel being unattached to the body of the bag along its upper edge. Typically, such a garment bag has a zipper running substantially the entire length down the front of the bag, dividing the front into two panels. The panels are secured at the bottom and sides of the bag. Since the panels are unattached at the top, however, an opening in that part of the bag requires additional means for protecting and shielding the contents of the bag and also requires means for covering the zipper slide member to reduce the liklihood of the bag being opened inadvertently, or by intrusions of others.

One method used to cover the top of the zipper and front panels has been to sew a permanent cowl to the top and sides of the upper portion of the bag, leaving the cowl open along its bottom. The cowl bottom extends a sufficient distance down the bag to satisfactorily cover the top of the zippered panels. This has been somewhat unsatisfactory and users of such bags often find the cowl a substantial inconvenience because it interferes with locating the zipper slide. Also, the cowl is physically and psychologically confining, and it is a hindrance to the ease with which the user can gain access to the hanger trolley assembly to insert individual hangers and clothing into the bag or remove them from it.

One method contemplated for reducing the inconvenience of traditional cowls is to design them in separable halves, zippered together at the middle. By unzipping the cowl vertically up the middle, the main bag zipper could then be exposed. However, with the cowls fixed at the ends, the halves still would present an awkward barrier in using the bag. Conversely, by providing only zippers at the ends and none in the middle, the cowl could be loosened into a flap, but it would still hang over the main bag zipper and block the interior from visual inspection. Even by providing zippers at the ends and the middle of the cowl, the overall result would merely be to have two flaps hanging down. (Also, such zipper-laden cowls would be decidedly unattractive.)

In short, the conventional cowl, and other variations previously contemplated for such cowls, have only modest utility, yet they have considerable undesirable characteristics. Accordingly, it has long been felt desirable to provide a garment bag with some device or means having all the desirable characteristics of a conventional cowl, along with other advantageous features, without its disadvantages.

SUMMARY OF THE INVENTION

This invention contemplates a hanging bag or garment bag, sometimes referred to as a valet pack or portable wardrobe, having an elongated vertical main receptacle or compartment, the interior of which is accessable from the front, with closure means terminating adjacent the top of the receptacle, and a removable cowl covering a portion of the front of the receptacle adjacent the top. The removable cowl may itself be constructed as a small receptacle and may be equipped with means for hanging it independently of the main receptacle, for example, on a conventional closet hanger. The cowl and main receptacle may also be equipped with means for hanging the cowl on the side or rear of the main receptacle to permit ready access to the interior of either.

DETAILED DESCRIPTION OF THE INVENTION

Figure 1:
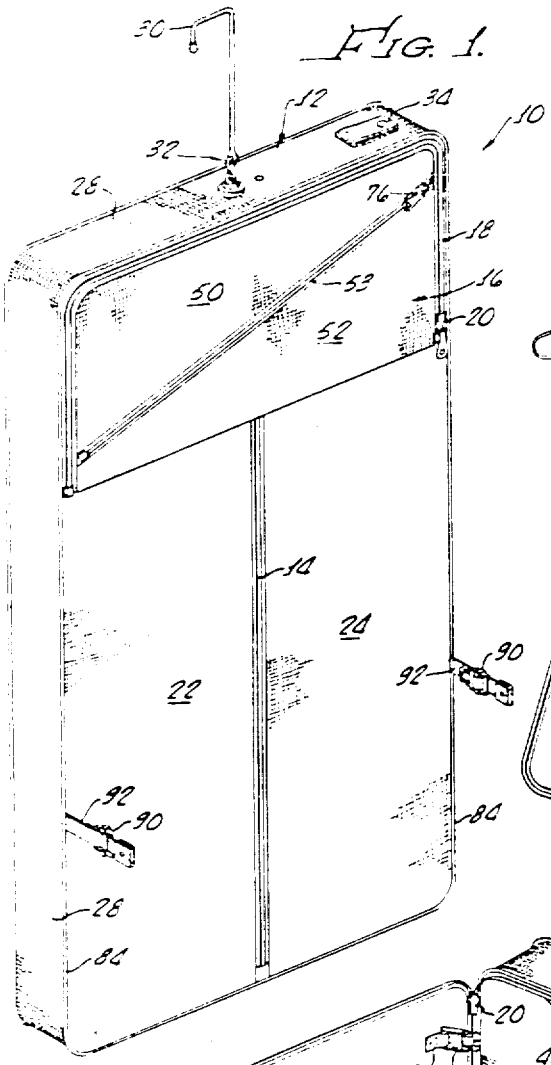
FIG. 1 is a front perspective view of a garment bag with attached cowl, the bag being in unfolded condition for hanging vertically from an independent support.
Figures 3, 4, 6:
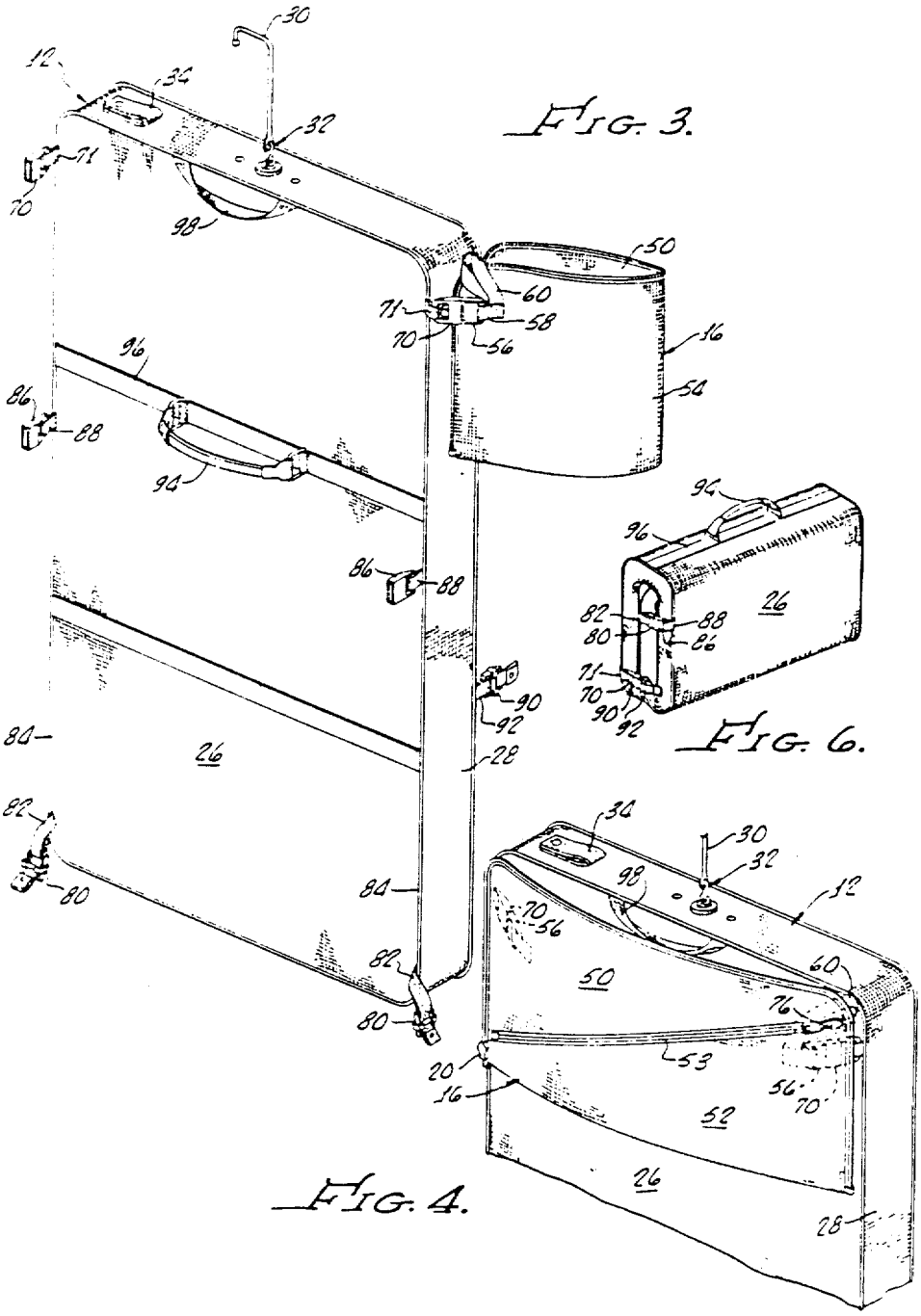
FIG. 3 is a rear perspective of the bag showing both ends of the cowl secured to one side of the main receptacle.
FIG. 4 is a fragmentary rear perspective of the upper end portion of the bag showing the cowl after it has been removed from the front of the main receptacle and attached to the rear thereof.
FIG. 6 is a perspective view of the garment bag in folded condition for carrying.

FIGS. 1 and 3 show the front and rear of a garment bag 10 having a main receptacle or compartment 12. A zipper closure means 14 is provided on the front for gaining or excluding access to the interior of the receptacle. A detachable or removable cowl 16 is affixed to the upper end portion of the main receptacle 12 by means of a separating zipper 18. The cowl 16 can be detached from the main receptacle by simply moving slide member 20 of zipper 18 from the right hand side of the bag across the top and down the left side until it is disengaged.

The vertical zipper 14 of the main receptacle 12 divides the front of the main receptacle into a pair of front wall panels 22 and 24, which together with rear wall panel 26, and peripheral wall panel 28, form the generally rectangular configuration of the main compartment 12.

The main compartment 12 and the detachable cowl 16 may be comprised of a flexible material such as heavy duty nylon fabric to allow the bag to be collapsed or folded for carrying or storage. A hanger hook 30 is connected to the top of main receptacle 12 by connecting means 32. The hanger hook 30 is designed to be used when the garment bag is in unfolded condition as shown in FIGS. 1 and 3, to suspend the bag vertically from an external support member (not shown) such as a closet bar. When the hanger hook is not in use, it can be stored and retained by securing means 34 which may comprise a fabric stay with a detachable snap, or the like, for securing the hook.

Figure 2:
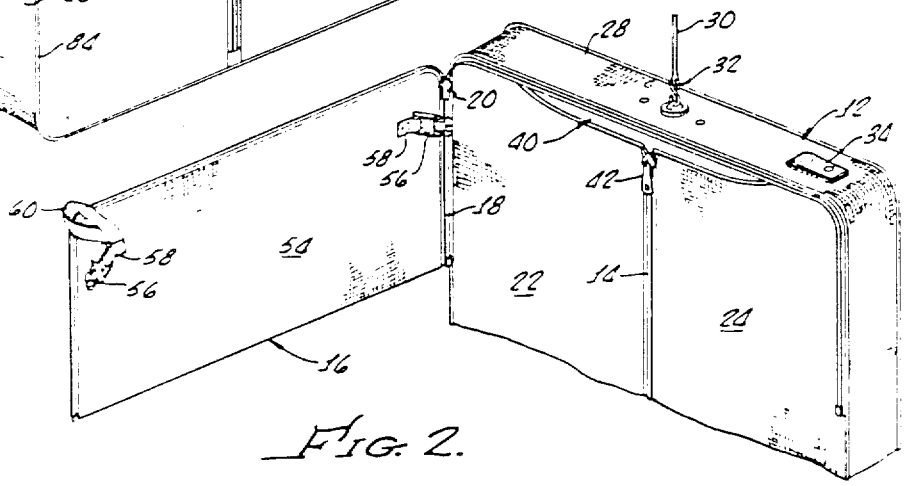
FIG. 2 is a fragmentary front perspective of the upper end portion of the bag showing the removable cowl partially detached from the main receptacle for access to the top thereof.

As shown in FIG. 2, access to the interior of main receptacle 12 can be readily achieved by simply partially, or completely, unzipping zipper closure member 18 and folding, or removing, cowl 16 from the main compartment 12 to expose slide member 42 of zipper closure means 14. As shown in FIG. 2, an opening 40 is defined by the top edges of front wall panels 22 and 24, since those edges are not attached to the top portion of peripheral wall panel 28. Thus, when zipper slide member 42 is pulsed downwardly, the two front wall panels 22 and 24, may be folded back to expose the interior of the bag, and gain access to the hanger trolley assembly (not shown) where clothing hangers, and the like, are stored.

The cowl member 16 has particularly advantageous features in the garment bag of the present invention. As shown in FIG. 1, the cowl member 16 includes front wall members 50 and 52 and a diagonal zipper closure means 53, the front wall members 50 and 52 being sewn or otherwise secured at their periphery to rear wall member 54 (shown in FIG. 2). Secured to the rear wall member 54, are horizontal buckle latches 56, which are attached by flexible web members 58 sewn to rear wall member 54. Also secured to the cowl adjacent one upper corner is hanger loop 60, whose use will be described hereinafter.

FIG. 3 shows the cowl 16 secured in a folded position by engaging buckle latch 56 with buckle receiver 70, the latter being affixed by means of flexible web 71 to the upper end portion of the garment bag.

FIG. 4 shows the upper portion of the garment bag from the rear when the cowl 16 has been completely detached from the front of the bag and positioned and suspended on the rear of the bag as shown. The cowl 16 is suspended from the rear wall 26 of the main receptacle by means of compatable pairs of buckle latches 56 and buckle receivers 70, which are attached to the rear walls 54 and 26 of the cowl and main receptacle, respectively.

Figure 5:
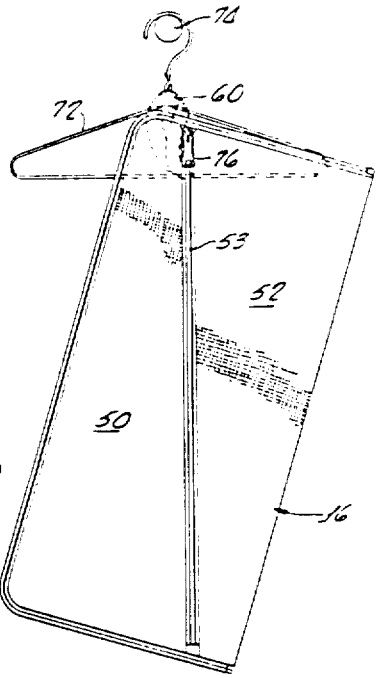
FIG. 5 is a front elevation of the cowl detached from the main receptacle and hung separately on a clothes hanger.

FIG. 5 shows the use of the cowl as a separate vertically disposed container when it is removed completely from main receptacle 12. The cowl is suspended by means of loop 60 from a conventional clothes hanger 72 hanging from a closet bar 74. Access to the interior of the cowl is readily gained by moving zipper slide member 76 downwardly to separate the front wall members 50 and 52.

As disclosed, there are at least four principal options for using cowl member 16. As shown in FIG. 1, the cowl member can be left intact secured to the front of main receptacle 12. Alternatively, the cowl member can be folded away for easy access to main receptacle 12, as shown in FIG. 3. If it is desired to maintain the cowl member in a generally horizontal position, while still gaining ready access to the interior of main receptacle 12, then the cowl member can be removed from the front of the main receptacle and attached to the rear thereof, as shown in FIG. 4. Finally, the cowl member can be totally removed from the main receptacle to position it in a vertical posture as shown in FIG. 5.

FIGS. 1, 3 and 6, illustrate the various components used for securing the garment bag in a folded condition for transporting or storage. Thus, lower buckle latches 80, which are attached by flexible fabric webs 82 to the peripheral seam 84 (which secures the various main receptacle wall panels together) are engaged with buckle receivers 86. The buckle receivers 86 in turn are attached by means of flexible web 88 to seam 84. Similar connections secure buckle latches 90 by means of flexible webs 92 to the front of the bag at seams 84 as shown in FIG. 1.

FIG. 6 shows the bag folded with the various buckle members secured at one side of the bag and corresponding members (not shown in FIG. 6) are secured at the other side of the bag. When the bag is folded as shown in FIG. 6, hand grip 94 will be positioned at the top of the folded bag. Hand grip 94 is secured to strengthening member 96 which may include an additional thickness of fabric or web material and also may include a rigid bar or other member secured to the underside of the fabric to act as a stiffener.

A carrying loop or hanging loop 98 is also provided at the upper end of the main receptacle 12 attached to the seam between the rear wall panel 26 and the peripheral wall panel 28. This loop permits the user to carry the folded bag (as shown in FIG. 6) in an inverted position, if desired, and it also provides an alternative hanging device to use in place of hanger hook 30, as shown in FIG. 3.

Many other uses and variations of the invention will be apparent to those skilled in the art, and while specific embodiments of this invention have been described, these are intended for illustrative purposes only. It is intended that the scope of the invention be limited only by the attached claims.

What is claimed is:

1. A garment bag comprising:

a vertically elongated main receptacle having generally rectangular, horizontal and vertical cross sections and including rear wall panel means, front wall panel means substantially parallel and spaced apart from said rear wall panel means, peripheral wall means connecting said rear and front wall panel means at their corresponding edges, zipper closure means running substantially vertically up said front wall panel means dividing said front wall panel means into two separable halves from the top to substantially the bottom thereof, said halves being affixed along their bottom edges and outside edges to said peripheral wall means, but being unattached along at least a portion of their top edges, said receptacle being constructed of collapsable material and being vertically foldable such that when folded, an upper portion of said receptacle faces and is aligned with a lower portion thereof, retaining means for securing said receptable in folded position, cowl means for covering the upper edge of said front wall panel means, and zipper means for detachably connecting said cowl means to said receptacle, said zipper means running along at least a substantial portion of the side edges and along the top edge of said cowl means, and along corresponding edge portions of said receptacle.

2. The invention recited in claim 1 wherein said cowl means comprises a generally rectangular double-walled container having a front wall and a rear wall and further includes zipper closure means for entry and closure of said container.

3. The invention recited in claim 2 wherein said zipper closure means runs diagonally across said front wall of said cowl means.

4. The invention recited in claim 2 wherein said cowl means further includes fastening means affixed to the rear wall thereof for detachably securing said cowl means to said retaining means when said receptacle is in an unfolded position.

5. The invention recited in claim 4 wherein said garment bag further includes means affixed to the top of said receptacle for suspending said bag vertically from a hanger bar and wherein said fastening means and said retaining means comprise compatible pairs of buckle latches and receivers positioned to align and buckle the rear wall of said cowl means to an upper end portion of the rear panel of said receptacle, whereby when said garment bag is suspended from a hanger bar, said vertical zipper closure means on the front of said receptacle is fully accessable from the front of said bag and said zipper closure means on said cowl means is fully accessable from the rear of said bag.

6. The invention recited in claim 5 wherein said zipper closure means on said cowl means opens and closes diagonally across said front wall.

7. The invention recited in claim 6 wherein said garment bag further includes hand grip means affixed adjacent the rear panel of said receptacle intermediate the ends thereof for carrying said bag when it is in a folded position.

8. A garment bag comprising:

a vertically elongated main receptacle having generally rectangular, horizontal, and vertical cross sections, and including rear wall panel means, front wall panel means substantially parallel and spaced apart from said rear wall panel means, *and* peripheral wall means connecting said rear and front wall panel means at their corresponding edges, [and zipper closure means affixed to said front wall panel means for permitting and excluding access to the interior of said receptacle,]

said front wall panel means being affixed along its bottom edge and side edges to said peripheral wall means, but being unattached along at least a portion of its top edge, said receptacle being constructed of [collapsable] *collapsible* material and being vertically foldable such that, when folded, an upper portion of said receptacle faces and is aligned with a lower portion thereof, retaining means for securing said receptacle in folded position, cowl means for covering the upper edge of said front wall panel means, and zipper means for detachably connecting said cowl means to said receptacle, said zipper means running along at least a substantial portion of the side edges and along the top edge of said cowl means, and along corresponding edge portions of said receptacle.

9. The invention recited in claim 8 wherein said cowl means comprises a double-walled container having a front wall and a rear wall and zipper means for entry and closure thereof.

10. The invention recited in claim 9 further comprising means adjacent at least one edge of said cowl means for securing the cowl means to said rear wall panel means when said bag is in unfolded position.

11. The invention recited in claim 9 further including means affixed to said cowl means for suspending said cowl means vertically from a hanger when said cowl means is detached from said receptacle.

* * * * *